United States Patent
Park et al.

(10) Patent No.: US 11,721,325 B1
(45) Date of Patent: Aug. 8, 2023

(54) METHOD FOR GENERATING LEARNING DATA FOR SPEECH RECOGNITION ERROR DETECTION

(71) Applicant: ActionPower Corp., Seoul (KR)

(72) Inventors: Seongmin Park, Seoul (KR); Dongchan Shin, Seoul (KR); Sangyoun Paik, Gwangmyeong-si (KR); Subong Choi, Seoul (KR); Alena Kazakova, Siheung-si (KR); Jihwa Lee, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 17/875,112

(22) Filed: Jul. 27, 2022

(30) Foreign Application Priority Data

Jun. 13, 2022 (KR) .......................... 10-2022-0071409

(51) Int. Cl.
*G10L 15/06* (2013.01)
*G06F 40/284* (2020.01)

(52) U.S. Cl.
CPC .......... *G10L 15/063* (2013.01); *G06F 40/284* (2020.01)

(58) Field of Classification Search
CPC ... G10L 15/063; G10L 15/075; G10L 19/135; G10L 15/00; G06F 40/284; G06F 3/015
See application file for complete search history.

(56) References Cited

U.S. PATENT DOCUMENTS

| | | | |
|---|---|---|---|
| 11,315,547 B2 | 4/2022 | Kim et al. | |
| 11,562,735 B1* | 1/2023 | Gupta | .................. G10L 15/197 |
| 2018/0293990 A1* | 10/2018 | Li | .......................... G10L 17/18 |
| 2018/0315417 A1 | 11/2018 | Flaks et al. | |
| 2021/0056127 A1* | 2/2021 | Chen | .................. G06F 16/2477 |
| 2021/0141995 A1* | 5/2021 | Lundgaard | ............. G06F 17/18 |
| 2021/0248996 A1 | 8/2021 | Itoh et al. | |
| 2021/0365114 A1* | 11/2021 | Hewage | ................. G06F 3/015 |
| 2021/0398280 A1* | 12/2021 | Bae | ....................... G06N 3/084 |
| 2022/0067304 A1 | 3/2022 | Luong et al. | |

(Continued)

FOREIGN PATENT DOCUMENTS

| | | |
|---|---|---|
| KR | 10-2146524 B1 | 8/2020 |
| KR | 10-2152902 B1 | 9/2020 |
| KR | 10-2267276 B1 | 6/2021 |

(Continued)

OTHER PUBLICATIONS

Zhu et al., Mixup Learning Strategies for Text-independent Speaker Verification, Sep. 2019, InterSpeech, all pages (Year: 2019).*

(Continued)

*Primary Examiner* — Michael Colucci
(74) *Attorney, Agent, or Firm* — Seed IP Law Group LLP

(57) ABSTRACT

Disclosed is a method for generating data, the method is performed by one or more processors of a computing device. The method may include: segmenting text data generated based on speech information into a token unit; generating a first feature vector based on the text data segmented into the token unit, and generating a first label vector corresponding to the generated first feature vector, and generating a second feature vector and a second label vector by performing mix-up for each of the generated first feature vector and the generated first label vector.

10 Claims, 5 Drawing Sheets

(56) References Cited

U.S. PATENT DOCUMENTS

2022/0188643 A1* 6/2022 Fukuda .................. G06N 3/045
2022/0270353 A1* 8/2022 Bai .................... G06V 10/7715

FOREIGN PATENT DOCUMENTS

KR   10-2022-0022343 A   2/2022
KR   10-2022-0029362 A   3/2022

OTHER PUBLICATIONS

Zhang et al. mixup: Beyond Empirical Risk Minimization, 2018, ICLR, all pages (Year: 2018).*

Tomashenko et al, Speaker adaptive training and mixup regularization for neural network acoustic models in automatic speech recognition, Sep. 2018, ICLR, all pages (Year: 2018).*

Lim et al., "An Automatic Data Construction Approach for Korean Speech Command Recognition," *Journal of the Korea Society of Computer and Information* 24(12): 17-24, 2019.

Jeong et al., "Imbalanced Text Classification based on Mixup Method," *Journal of Korea Institute of Science and Technology Information* 48(01):0932-0934, 2021.

Jeong et al. "Imbalanced Text Classification Based on Mixup Method," The Korean Society of Information Sciences Conference, vol. 48, pp. 932-934, 2021.

Fang et al., "STEMM: Self-learning with Speech-text Manifold Mixup for Speech Translation," arXiv:2203.10426, pp. 1-13, Mar. 20, 2021.

Park et al., "Improving Distinction between ASR Errors and Speech Disfluencies with Feature Space Interpolation," pp. 1-6, Aug. 4, 2021.

* cited by examiner

METHOD FOR GENERATING LEARNING DATA FOR SPEECH RECOGNITION ERROR DETECTION

CROSS-REFERENCE TO RELATED APPLICATIONS

This application claims priority to and the benefit of Korean Patent Application No. 10-2022-0071409 filed in the Korean Intellectual Property Office on Jun. 13, 2022, the entire contents of which are incorporated herein by reference.

BACKGROUND

Technical Field

The present disclosure relates to a method for generating learning data for speech recognition error detection, and more particularly, to a method for generating learning data in order to train a neural network model for speech recognition error detection.

Description of the Related Art

Automatic Speech Recognition (ASR) error detection is a task which requires much more time than the existing text labeling because both audio and text information are used in a dataset construction process.

In learning using the existing neural network, when text data is input into a neural network, the text data is expressed as an arrangement of tokens whose number IDs are given, but the token IDs are not continuous, so it is difficult to increase the data.

BRIEF SUMMARY

The present disclosure takes into consideration that, for example, in the case of image pixel data, an image is not changed in spite of changing a pixel value a little, but in the case of a token of a text, when the token ID is changed even a little, the text is replaced with another word, and as a result, a meaning of a sentence is completely changed. As a result, there is a problem in that an overfitting prevention effect due to data augmentation is not normally implemented.

Accordingly, a new data generation technology capable of solving the problem or disadvantage is beneficial.

One or more embodiments of the present disclosure solve the various technical problems in the related art including the problem identified above.

One or more embodiments of the present disclosure provide a method for generating learning data in relation to training a neural network model for dialogue speech recognition error detection.

An embodiment of the present disclosure provides a method performed by a computing device. The method may include: segmenting text data generated based on speech information into a token unit; generating a first feature vector based on the text data segmented into the token unit, and generating a first label vector corresponding to the generated first feature vector, and generating a second feature vector and a second label vector by performing mix-up for each of the generated first feature vector and the generated first label vector.

Alternatively, the method may further include training a neural network model based on the generated second feature vector and the generated second label vector.

Alternatively, the data generation may be to train a neural network model for speech recognition error detection, and the mix-up may include manifold-mix-up.

Alternatively, the generating of the second feature vector and the second label vector by performing the mix-up for each of the generated first feature vector and the generated first label vector may include performing a shuffle by applying the same index to the first feature vector and the first label vector.

Alternatively, the performing of the shuffle by applying the same index to the first feature vector and the first label vector may include performing the shuffle based on random permutation for the first feature vector, and performing the shuffle for the first label vector based on a random permutation which is the same as the random permutation.

Alternatively, the generating of the second feature vector and the second label vector by performing the mix-up for each of the generated first feature vector and the generated first label vector may further include generating the second feature vector by performing the mix-up between the first feature vector and a shuffled version of the first feature vector, and generating the second label vector by performing the mix-up between the first label vector and the shuffled version of the first label vector.

Alternatively, the training of the neural network model based on the generated second feature vector and the generated second label vector may include determining a prediction label by inputting the generated second feature vector into the neural network model, and training the neural network model based on the determined prediction label and the second label vector.

Alternatively, the determining of the prediction label by inputting the generated second feature vector into the neural network model may include determining a label by predicting whether an error occurs based on whether an output value of the neural network model exceeding a set threshold value.

Alternatively, the training of the neural network model based on the determined prediction label and the second label vector may include setting the second label vector to a ground truth, and training the neural network model by making the prediction label correspond to the second label vector.

Alternatively, the setting of the second label vector to the ground truth, and training of the neural network model by making the prediction label correspond to the second label vector may include calculating an error between the prediction label and the second label vector by using a loss function and training the neural network model based on the calculated error.

An embodiment of the present disclosure provides a method performed by a computing device. The method may include: segmenting text data generated based on speech information into a token unit; and performing speech recognition error detection based on the segmented tokens by using a pre-learned neural network model, and the pre-learned neural network model may correspond to a model learned based on data generation, and the data generation may be implemented by performing mix-up for each of a first feature vector generated based on a plurality of tokens and a first label vector corresponding to the first feature vector.

Another embodiment of the present disclosure provides a computer program stored in a computer-readable storage medium. The computer program may allow one or more processors to perform operations for data generation when the computer program is executed by the one or more processors, and the operations may include: segmenting text data generated based on speech information into a token unit; generating a first feature vector based on the text data segmented into the token unit, and generating a first label vector corresponding to the generated first feature vector; and generating a second feature vector and a second label vector by performing mix-up for each of the generated first feature vector and the generated first label vector.

Still another embodiment of the present disclosure provides a computing device. The device may include: at least one processor; and a memory, and the processor may be configured to segment text data generated based on speech information into a token unit; generate a first feature vector based on the text data segmented into the token unit, and generate a first label vector corresponding to the generated first feature vector, and generate a second feature vector and a second label vector by performing mix-up for each of the generated first feature vector and the generated first label vector.

According to an embodiment of the present disclosure, a data generation method can be provided, and a method for generating learning data in order to train a neural network model for speech recognition error detection can be provided.

Effects which can be obtained in the present disclosure are not limited to the aforementioned effects and other unmentioned effects will be clearly understood by those skilled in the art from the following description.

DETAILED DESCRIPTION

Figure 1:
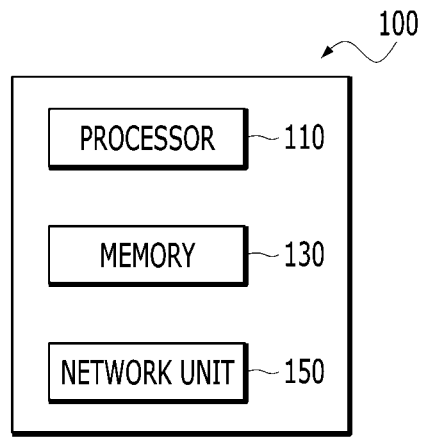
FIG. 1 is a block diagram of a computing device for generating a summary of a dialogue according to an embodiment of the present disclosure.

Various embodiments will now be described with reference to drawings. In the present specification, various descriptions are presented to provide appreciation of the present disclosure. However, it is apparent that the embodiments can be executed without the specific description. "Component," "module," "system," and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art recognizes that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for generating data according to an embodiment of the present disclosure.

A configuration of the computing device 100 illustrated in FIG. 1 is only an example shown through simplification. In an embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an embodiment of the present disclosure. According to an embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an embodiment of the present disclosure, processors of a plurality of computing devices may be used together to process the learning of the network function and the data classification using the network function. Further, the computer program executed in the computing device according to an embodiment of the present disclosure may be a CPU, GPGPU, or TPU executable program.

The processor 110 according to an embodiment of the present disclosure may recognize speech information to generate data, and generate text data based on the speech information, and perform operations of segmenting the generated text data into a token unit. In this case, the speech information may be SCOTUS corpus, information on telephone conversation, AMI meeting corpus, ICSI meeting corpus, or information on KsponSpeech data.

According to an embodiment of the present disclosure, the processor 110 may generate a first feature vector based on the text data segmented into the token unit, and generate a first label vector corresponding to the generated first feature vector.

The processor 110 may generate a second feature vector and a second label vector by performing mix-up for each of the generated first feature vector and the generated first label vector.

According to an embodiment of the present disclosure, the memory 130 may store any type of information generated or determined by the processor 110 or any type of information received by the network unit 150.

According to an embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an embodiment of the present disclosure may use an arbitrary type known wired/wireless communication systems.

For example, the network unit 150 may receive speech information from an external system. In this case, information received from a database may be data for generating learning data for speech recognition error detection. The speech information may include the information of the examples, but is not limited to the above-described example, and may be variously constituted within a range which may be appreciated by those skilled in the art.

The network unit 150 may transmit and receive information processed by the processor 110, a user interface, etc., through communication with the other terminal. For example, the network unit 150 may provide the user interface generated by the processor 110 to a client (e.g., a user terminal). Further, the network unit 150 may receive an external input of a user applied to the client and deliver the received external input to the processor 110. In this case, the processor 110 may process operations such as output, modification, change, addition, etc., of information provided through the user interface based on the external input of the user delivered from the network unit 150.

Meanwhile, according to an embodiment of the present disclosure, the computing device 100 as a computing system that transmits and receives information to and from the client through communication may include a server. In this case, the client may be any type of terminal which may access the server. For example, the computing device 100 which is the server may generate a data generation result by receiving information for generating data from an external database, and provide a user interface for the generation result of the data to the user terminal. In this case, the user terminal may output the user interface received from the computing device 100 as the server, and receive and process the information through an interaction with the user.

In an additional embodiment, the computing device 100 may also include any type of terminal that performs additional information processing by receiving a data resource generated in any server.

Figure 2:
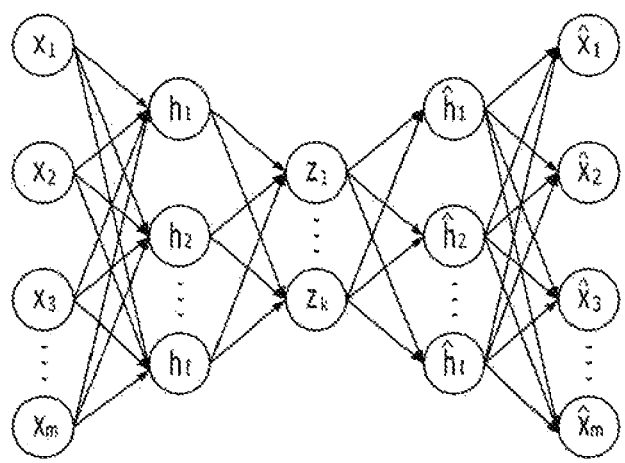
FIG. 2 is a schematic view illustrating a network function according to an embodiment of the present disclosure.

FIG. 2 is a schematic diagram illustrating a network function according to an embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another embodiment of the present disclosure, the number of nodes of the input layer may be larger than the number of nodes of the output layer, and the neural network may be a neural network of a type in which the number of nodes increases from the input layer to the hidden layer. The neural network according to still yet another embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having the smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to reduce or minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 3:
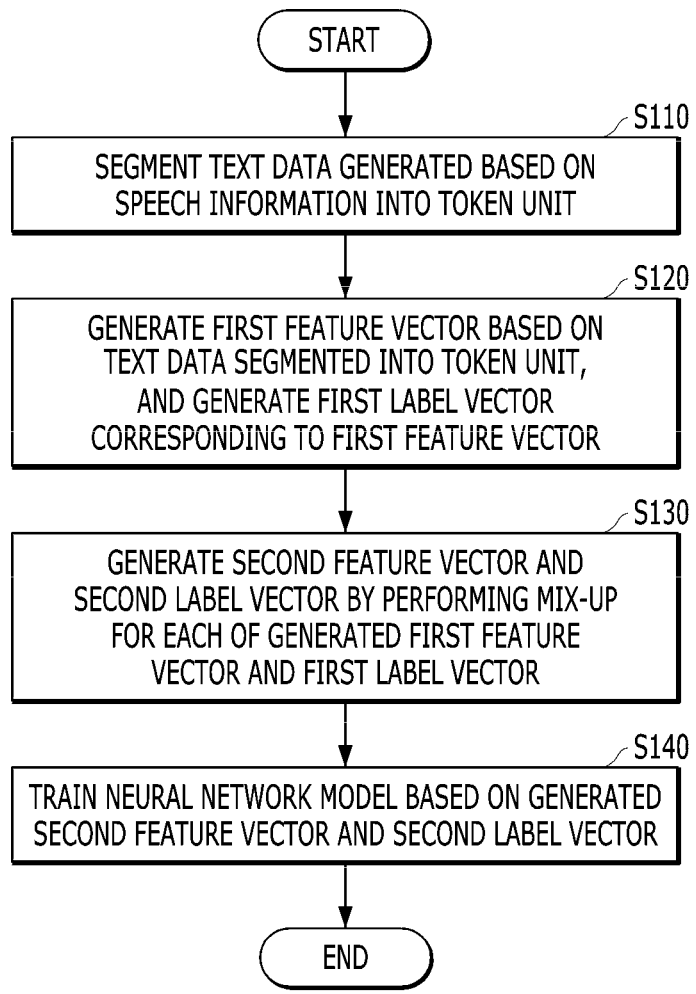
FIG. 3 is a flowchart illustrating a method for generating learning data in order to train a neural network model for speech recognition error detection according to an embodiment of the present disclosure.

FIG. 3 is a flowchart illustrating a method for generating learning data in order to train a neural network model for speech recognition error detection according to an embodiment of the present disclosure.

The computing device 100 according to an embodiment of the present disclosure may acquire the speech information or receive the speech information from an external system in relation to data generation. Here, the external system may be a server, a database, etc., which stores and manages information related to the data generation. The computing device 100 may use the speech information received from the external system as basic information for generating the learning data. The data generation is to train a neural network model for speech recognition error detection. Referring to FIG. 3, the computing device 100 according to an embodiment of the present disclosure may generate text data based on the speech information and segment the generated text data into a token unit (S110). For example, a reference transcript which is a ground truth is "It was like um coarse," and the computing device 100 may generate a text "I was like of course." According to an embodiment, the computing device 100 may generate the text from the speech information according to automatic speech recognition (ASR) or speech-to-text (STT). According to another embodiment, the computing device 100 receives text data for determining error detection from the external system jointly with the reference transcript to generate the text data. The computing device 100 may segment the generated text data of "I was like of course" into token units of [I, was, like, of, course]. In this case, the speech information may be SCOTUS corpus, information on telephone conversation, AMI meeting corpus, ICSI meeting corpus, or information on KsponSpeech data, and may include various speech data in addition to the examples. Further, the token unit may be implemented as various types such as a word unit, a morpheme unit, etc.

The computing device 100 may generate a first feature vector based on the text data segmented into the token unit, and generate a first label vector corresponding to the first feature vector (S120).

The computing device 100 may generate a second feature vector and a second label vector by performing mix-up for each of the first feature vector and the first label vector generated through step S120 (S130). In this case, the mix-up may include a manifold mix-up and the manifold mix-up means mix-up for data converted into a vector type. In respect to the manifold mix-up, the mix-up is conducted in a feature space which is a middle where data passes through the neural network to enhance regularization performance as compared with existing mix-up and reduce the overfitting problem described above by referring to FIG. 2. Further, since the manifold mix-up is applied when the text is converted into a continuous vector type, a problem may be solved, which may occur when the mix-up is applied in an original data state before vectorization. For example, when the mix-up is performed in the original data state, a problem may occur in that if token IDs of tokens (of which locations are important) are changed even a little, an original word is replaced with another word and a meaning of a sentence is completely changed, and such a problem may be solved through the manifold mix-up.

The computing device 100 may train the neural network model based on the second feature vector and the second label vector generated through step S130 (S140).

Meanwhile, according to an embodiment of the present disclosure, a mix-up operation in step S130 above may be implemented based on a shuffle operation.

For example, the step (S130) of generating the second feature vector and the second label vector by performing the mix-up for each of the first feature vector and the first label vector may include (1) a step of performing a shuffle for the first feature vector and the first label vector, (2) a step of generating the second feature vector by performing the mix-up between the first feature vector and a shuffled version of the first feature vector, and (3) a step of generating the second label vector by performing the mix-up between the first label vector and a shuffled version of the first label vector.

Specific examples in which the mix-up operation in step S130 above is implemented based on the shuffle operation will be described in detail with reference to FIGS. 4 and 5.

Figure 4:
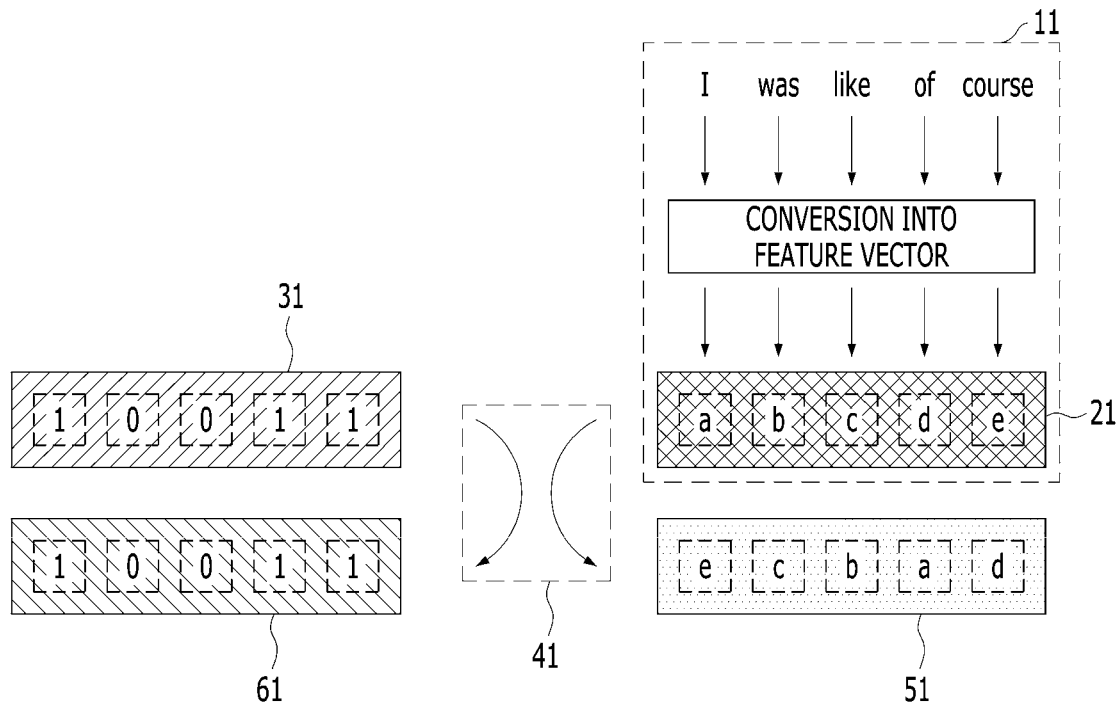
FIG. 4 is a schematic view for describing a step of generating a first feature vector and a first label vector, and performing a shuffle according to an embodiment of the present disclosure.

FIG. 4 is a schematic view for describing a step of generating a first feature vector and a first label vector, and performing a shuffle according to an embodiment of the present disclosure.

Referring to FIG. 4, the computing device 100 according to an embodiment of the present disclosure may generate a first feature vector 21 based on text data segmented into a token unit (11). Specifically, the computing device 100 may convert the text data segmented into the token unit into a vector format containing a meaning for each token by using a pre-learned language model neural network. Here, the converted vector may be set to the first feature vector 21, and the first feature vector 21 may be expressed as an array of vectors which are as large as the number of tokens. For example, the computing device 100 may generate a first feature vector 21 expressed as a vector format of (a, b, c, d, e) based on the text data segmented into the token units of [I, was, like, of, course].

In this case, the used language model neural network may include a GPT series, RoBERTA, ELECTRA, BERT, etc., and may include various language model neural networks in addition to the examples.

The computing device 100 may generate a first label vector 31 corresponding to the generated first feature vector 21. For example, the computing device 100 may generate a first label vector 31 having the same length, which contains an error/accuracy label for each token of the first feature vector 21. As described above with reference to FIG. 3, the computing device 100 compares the text "I was like of course" for the speech recognition error detection with the reference transcript "It was like um coarse" to determine an error (1) and accuracy (0) for each segmented token and generate a label vector corresponding to a feature vector. Specifically, when the first feature vector 21 is generated as (a, b, c, d, e), the first label vector 31 corresponding to the first feature vector 21 may be generated as (1, 0, 0, 1, 1). As a result, the first feature vector 21 and the first label vector 31 may have the same length, and respective components may correspond to each other.

According to an embodiment of the present disclosure, the computing device 100 may perform the shuffle by applying the same index to the first feature vector and the first label vector (41).

Specifically, the computing device 100 may perform the shuffle based on random permutation for the first feature vector 21, and perform the shuffle for the first label vector based on a random permutation which is the same as the random permutation. As a result, a shuffled version 51 of the first feature vector and a shuffled version 61 of the first label vector may be acquired. For example, in the example of FIG. 4, the components of the first feature vector 21 and the first label vector 31 correspond to each other as (a:1, b:0, c:0, d:1, e:1). The shuffled version 51 of the first feature vector of a result (e, c, b, a, d) of performing the shuffle may be acquired based on the random permutation for the first feature vector 21, and as a result, the shuffled version 61 of the first label vector of a result (1, 0, 0, 1, 1) of performing the shuffling may be acquired based on the random permutation which is the same as the random permutation for the first label vector 31.

In the case of the above embodiment described with reference to FIG. 4, the first label vector 31 and the shuffled version 61 are the same in spite of the shuffle, but this may vary according to the embodiment.

For example, in the case of an embodiment of shuffling the first feature vector 21 like (a, e, d, c, b) other than (e, c, b, a, d) 51 of the above embodiment, the first label vector (1, 0, 0, 1, 1) 31 may be shuffled to (1, 1, 1, 0, 0).

Figure 5:
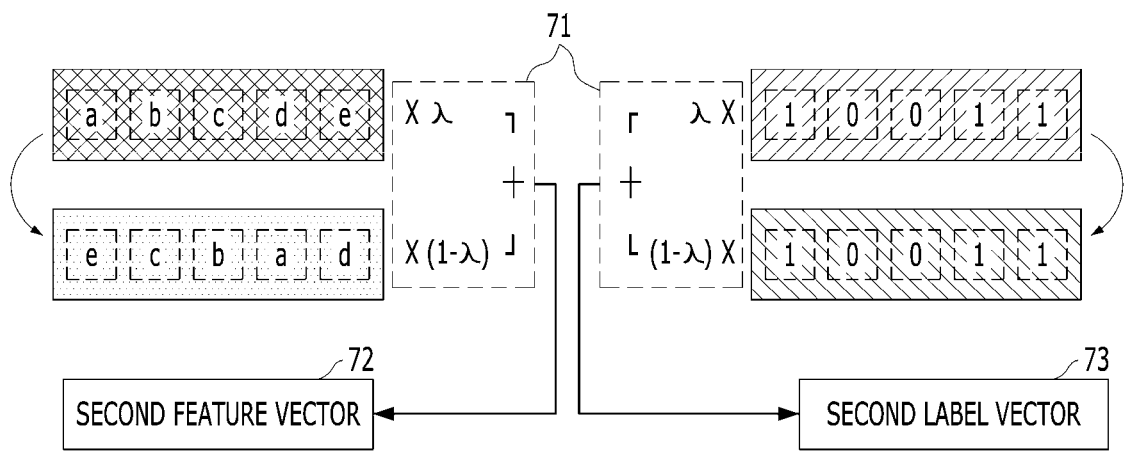
FIG. 5 is a schematic view illustrating a method for generating a second feature vector and a second label vector by performing mix-up for each of the first feature vector and the first label vector according to an embodiment of the present disclosure.

FIG. 5 is a schematic view illustrating a method for generating a second feature vector and a second label vector by performing mix-up for each of the first feature vector and the first label vector according to an embodiment of the present disclosure.

According to an embodiment of the present disclosure, the computing device 100 may generate a second feature vector 72 and a second label vector 73 by performing mix-up for each of the generated first feature vector 21 and the generated first label vector 31 (71). Specifically, the computing device 100 performs the mix-up between the first feature vector 21 and the shuffled version 51 of the first feature vector (71) to generate the second feature vector 72 and performs the mix-up between the first label vector 31 and the shuffled version 61 of the first label vector (71) to generate the second label vector 73.

In this case, the mix-up may be performed through the following equations. A method for performing the mix-up through the following equations may be referred to as data interpolation. Through the data interpolation, regularization for preventing data augmentation or overfitting described with reference to FIG. 2 may be achieved.

$$\text{Second feature vector} = (\text{first feature vector} \odot \lambda) + (\text{shuffled version of first feature vector} \odot (1-\lambda)) \quad \text{[Equation 1]}$$

$$\text{Second label vector} = (\text{first label vector} \odot \lambda) + (\text{shuffled version of first label vector} \odot (1-\lambda)) \quad \text{[Equation 2]}$$

In Equations 1 and 2 above, X represents a hyper parameter having a value between 0 and 1 and $\odot$ represents an operation symbol of performing a scalar product for each of components of a vector. The computing device 100 may acquire at least one second feature vector 72 and at least one second label vector 73 by performing the mix-up by adjusting $\lambda$ in Equations 1 and 2 above (71). For example, the computing device 100 multiplies each component by the hyper parameter $\lambda$ in the first feature vector 21, multiplies each component of the shuffled version 51 of the first feature vector by $(1-\lambda)$, and then adds both vectors to perform the mix-up (71).

The computing device 100 may generate the second label vector 73 corresponding to the second feature vector 72 by similarly performing the mix-up based on Equation 2 above between the first label vector 31 and the shuffled version 61 of the first label vector (71). In this case, the second label vector 73 may adopt a binary label of 0 or 1. A technical effect may be obtained, in which the computing device 100 may generate data for learning the neural network model by generating a data set of at least one second feature vector 72 and at least one second label vector 73 by performing the mix-up (71). As described below with reference to FIG. 6, the data generated through the mix-up is used for learning to achieve the regularization for the overfitting prevention described above with reference to FIG. 2.

According to another embodiment, the computing device 100 may use existing data (e.g., a data set of the first feature vector 21 and the first label vector 31 corresponding thereto) for the learning jointly in addition to the data (e.g., the data set of the second feature vector 72 and the second label vector 73) generated through the mix-up, and as a result, the data augmentation may be achieved.

Figure 6:
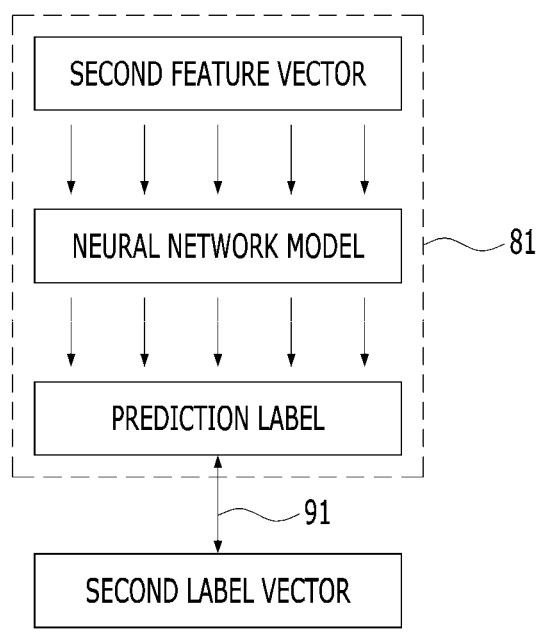
FIG. 6 is a schematic view illustrating a process of training a neural network model based on a prediction label and the second label vector determined by inputting the second feature vector into the neural network model.

FIG. 6 is a schematic view illustrating a process of training a neural network model based on a prediction label and the second label vector determined by inputting the second feature vector into the neural network model.

According to an embodiment of the present disclosure, the computing device 100 may train the neural network model based on the generated second feature vector 72 and the generated second label vector 73. Specifically, the computing device 100 may determine a prediction label by inputting the generated second feature vector 72 into the neural network model 81. In this case, the label may be determined by predicting whether an error occurs based on whether an output value of the neural network model exceeding a set threshold value. For example, the second feature vector 72 is input into the neural network model, and when the output value of the neural network model exceeds 0.2 which is the set threshold value, the error is predicted, and as a result, the label may be determined as a value of 1.

The computing device 100 may train the neural network model based on the determined prediction label and the second label vector 73. Specifically, the second label vector 73 may be set to the ground truth, and the prediction label corresponds to the second label vector 73 to train the neural network model (91). For example, when the second label vector 73 is generated as a vector of (1, 0, 0, 0, 1), the ground truth may also be similarly set to the vector of (1, 0, 0, 0, 1). In an existing token classification learning process, the prediction label is learned in response to "an original label corresponding to the first label vector 31," but according to an embodiment of the present disclosure, the prediction label may be learned in response to the second label vector 73 in which the mix-up is performed. Specifically, the computing device 100 may calculate an error generated by making the prediction label correspond to the second label vector 73 by using a loss function, and train the neural network model based on the calculated error. For example, the second label vector 73 may be generated as a vector of (1, 0, 0, 0, 1) and the second label vector 73 may be set to the ground truth. In this case, when the prediction label is determined as (1, 0, 0, 1, 1), a fourth component does not match in response to the second label vector 73, and as a result, a mismatch may be calculated as the error. Further, the calculated error is input into the neural network model again, and as a result, the neural network model may be learned to reduce the error. Therefore, the accuracy of the speech recognition error detection may be increased.

Token Level Score Comparison Table When Applying Existing Learning Scheme and Mix-Up

| Corpus | Error detection $F_1$ | |
|---|---|---|
| | Mixup | No mixup |
| SCOTUS (w21++) | 0.467 | 0.462 |
| SCOTUS (Kaldi) | 0.651 | 0.662 |
| CallHome (w21++) | 0.910 | 0.910 |
| CallHome (Kaldi) | 0.950 | 0.950 |
| AMI (w21++) | 0.760 | 0.746 |
| AMI (Kaldi) | 0.920 | 0.915 |
| ICSI (w21++) | 0.347 | 0.340 |
| ICSI (Kaldi) | 0.777 | 0.771 |
| Kspon (w21++) | 0.332 | 0.308 |
| Kspon (Kaldi) | 0.465 | 0.464 |

By additionally referring to the above table, it can be seen that an effect can be obtained in which the mix-up is performed for generating the learning data to improve the accuracy of the speech recognition error detection by comparing with the existing learning scheme in which the mix-up is not performed.

Hereinafter, a method for detecting a speech recognition error according to an embodiment of the present disclosure will be described.

According to an embodiment of the present disclosure, the computing device 100 may segment text data generated based on speech information into a token unit, and perform speech recognition error detection based on the segmented tokens by using a pre-learned neural network model.

Here, the pre-learned neural network model may correspond to a model learned based on data generation, and the data generation may be implemented by performing mix-up for each of a first feature vector 21 generated based on a plurality of tokens and a first label vector 31 corresponding to the first feature vector.

Meanwhile, a process of performing the mix-up for each of the generated first feature vector 21 and the first label vector 31 may include the process of performing the mix-up described above. Further, although specifically described for preventing a duplicate description, the features related to the category of the present disclosure may also be induced and applied to "the method for detecting the speech recognition error" according to an embodiment of the present disclosure.

Disclosed is a computer readable medium storing the data structure according to an embodiment of the present disclosure. The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning. Hereinafter, the computation model, the neural network, the network function, and the neural network will be integrated and described as the neural network. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include weights of the neural network (weights and parameters may be used as the same meaning in the present disclosure). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto. The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 7:
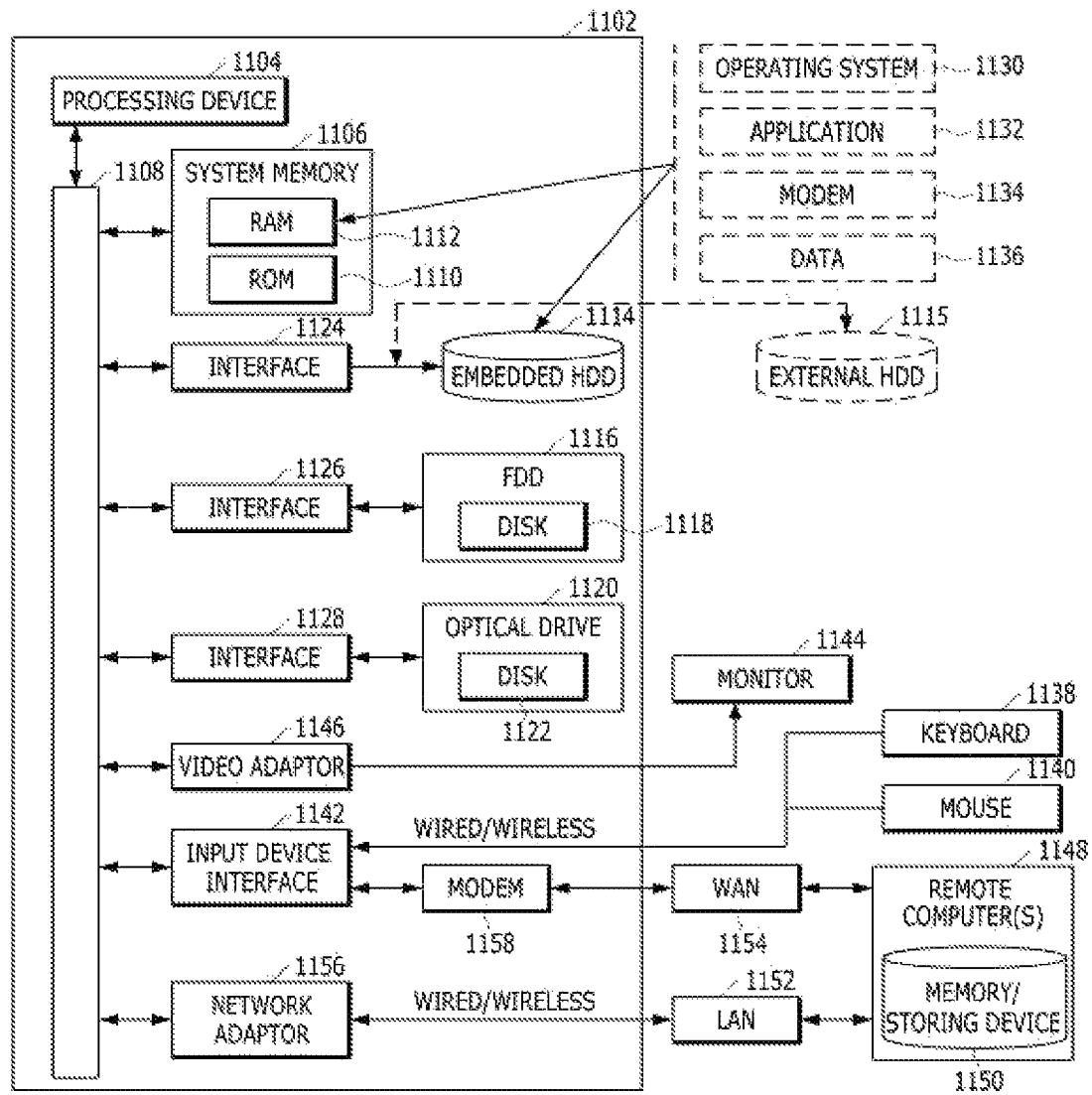
FIG. 7 is a simple and normal schematic view of a computing environment in which the embodiments of the present disclosure may be implemented.

FIG. 7 is a simple and normal schematic view of an computing environment in which the embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as software), or a combination of all of them. In order to clearly describe the intercompatibility of the hardware and the software, various components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be interpreted within the widest range which is coherent with the principles and new features presented herein. The various embodiments described above can be combined to provide further embodiments.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for generating data, the method performed by a computing device, the method comprising:
   segmenting text data generated based on speech information into a token unit;
   generating a first feature vector based on the text data segmented into the token unit, and generating a first label vector corresponding to the generated first feature vector;
   generating a second feature vector and a second label vector by performing mix-up for each of the generated first feature vector and the generated first label vector;
   determining a prediction label by inputting the generated second feature vector into a neural network model, and training the neural network model based on the determined prediction label and the second label vector.

2. The method of claim 1, wherein the data generation is to train a neural network model for speech recognition error detection, and
   wherein the mix-up includes manifold-mix-up.

3. The method of claim 1, wherein the generating of the second feature vector and the second label vector by performing the mix-up for each of the generated first feature vector and the generated first label vector includes:
   performing a shuffle by applying a same index to the first feature vector and the first label vector.

4. The method of claim 3, wherein the performing of the shuffle by applying the same index to the first feature vector and the first label vector includes:
   performing the shuffle based on random permutation for the first feature vector, and performing the shuffle for the first label vector based on a same random permutation.

5. The method of claim 3, wherein the generating of the second feature vector and the second label vector by performing the mix-up for each of the generated first feature vector and the generated first label vector further includes:
   generating the second feature vector by performing the mix-up between the first feature vector and a shuffled version of the first feature vector; and
   generating the second label vector by performing the mix-up between the first label vector and the shuffled version of the first label vector.

6. The method of claim 1, wherein the determining of the prediction label by inputting the generated second feature vector into the neural network model includes:
   determining a label by predicting whether an error occurs based on whether an output value of the neural network model exceeding a set threshold value.

7. The method of claim 6, wherein the training of the neural network model based on the determined prediction label and the second label vector includes:
   setting the second label vector to a ground truth, and training the neural network model by making the prediction label correspond to the second label vector.

8. The method of claim 7, wherein the setting of the second label vector to the ground truth, and training of the neural network model by making the prediction label correspond to the second label vector includes:
   calculating an error between the prediction label and the second label vector by using a loss function and training the neural network model based on the calculated error.

9. A computing device comprising:
   at least one processor; and
   a memory,
   wherein the at least one processor is configured to:
      segment text data generated based on speech information into a token unit;
      generate a first feature vector based on the text data segmented into the token unit, and generate a first label vector corresponding to the generated first feature vector,
      generate a second feature vector and a second label vector by performing mix-up for each of the generated first feature vector and the generated first label vector,
      determine a prediction label by inputting the generated second feature vector into a neural network model, and
      train the neural network model based on the determined prediction label and the second label vector.

10. A method for detecting a speech recognition error, the method performed by a computing device, the method comprising:
    segmenting text data generated based on speech information into a token unit; and
    performing speech recognition error detection based on the segmented tokens by using a pre-learned neural network model,
    wherein the pre-learned neural network model corresponds to a model learned based on data generation,
    wherein the data generation includes generating a second feature vector and a second label vector by performing mix-up for each of a first feature vector generated based on a plurality of tokens and a first label vector corresponding to the first feature vector, and
    wherein the pre-learned neural network model corresponds to a model learned based on a predicted label generated based on the second feature vector and the second label vector.

* * * * *